(12) United States Patent
Li et al.

(10) Patent No.: US 11,791,658 B2
(45) Date of Patent: Oct. 17, 2023

(54) INTERNET-OF-THINGS WIRELESS POWER TRANSFER SENSOR

(71) Applicant: TAMKANG UNIVERSITY, New Taipei (TW)

(72) Inventors: Ching-Lieh Li, New Taipei (TW); Yu-Jen Chi, New Taipei (TW); Hsiu-Ping Lin, New Taipei (TW)

(73) Assignee: TAMKANG UNIVERSITY, New Taipei (TW)

( * ) Notice: Subject to any disclaimer, the term of this patent is extended or adjusted under 35 U.S.C. 154(b) by 47 days.

(21) Appl. No.: 17/234,842

(22) Filed: Apr. 20, 2021

(65) Prior Publication Data

US 2022/0021240 A1 Jan. 20, 2022

(30) Foreign Application Priority Data

Jul. 14, 2020 (TW) .................................. 109123725

(51) Int. Cl.
*H02J 50/00* (2016.01)
*H02J 50/80* (2016.01)
*H02J 50/20* (2016.01)
*H02J 7/34* (2006.01)

(52) U.S. Cl.
CPC ............ *H02J 50/001* (2020.01); *H02J 7/345* (2013.01); *H02J 50/20* (2016.02); *H02J 50/80* (2016.02)

(58) Field of Classification Search
CPC ........... H02J 50/001; H02J 50/20; H02J 50/80
See application file for complete search history.

(56) References Cited

U.S. PATENT DOCUMENTS

| | | | | |
|---|---|---|---|---|
| 2012/0256492 | A1* | 10/2012 | Song | H02J 50/27 307/64 |
| 2014/0062668 | A1* | 3/2014 | Gudan | G06K 19/0715 340/10.4 |
| 2015/0229133 | A1* | 8/2015 | Reynolds | H04W 52/24 307/24 |
| 2019/0181688 | A1* | 6/2019 | Su | H04B 5/0037 |
| 2020/0071656 | A1* | 3/2020 | Bhat | H02J 50/80 |
| 2020/0212714 | A1* | 7/2020 | Pforr | B60L 53/12 |

* cited by examiner

*Primary Examiner* — Rexford N Barnie
*Assistant Examiner* — Joseph N Inge
(74) *Attorney, Agent, or Firm* — WPAT, P.C

(57) ABSTRACT

An IoT wireless power transfer sensor is provided, which includes a sensor circuit, a group of retrodirective searching antennas, a group of energy harvesting antennas and a communication antenna. The sensor circuit includes a switching unit, an energy converting unit, a power management unit and an energy converting and storage unit. The searching antennas are connected to the switching unit. When the switching unit is on, the searching antennas don't harvest the energy of an external device's scanning signal; they reflect the incident energy to the external device. The energy harvesting antenna is connected to the energy converting unit and receives the incident energy to charge the energy converting and storage unit. When the power storage level of the energy converting and storage unit reaches a first threshold value, the switching unit is consecutively switched between on and off to transmit a device information in back-scattered way to the external device.

7 Claims, 8 Drawing Sheets

INTERNET-OF-THINGS WIRELESS POWER TRANSFER SENSOR

CROSS REFERENCE TO RELATED APPLICATION

All related applications are incorporated by reference. The present application is based on, and claims priority from, Taiwan Application Serial Number 109123725, filed on Jul. 14, 2020, the disclosure of which is hereby incorporated by reference herein in its entirety.

TECHNICAL FIELD

The technical field relates to wireless power transfer sensor, in particular to an Internet-of-Things (IoT) wireless power transfer sensor.

BACKGROUND

Internet-of-Things (IoT) technology can connect various physical objects with one another via sensors and an application programming interface (API) with a view to form a virtual network, such that the physical objects can be connected to one another via Internet for data exchange. IoT technology will change the lifestyle of all human and make human life more and more convenient, so has become one of the major development trends in the future.

However, realizing an IoT system needs a large amount of IoT sensors. Although the IoT sensors are of low power consumption, these sensors still need to be powered by batteries, or these sensors cannot normally operate. Therefore, once the battery of any one of the IoT sensors has run out, the IoT system cannot normally work.

Besides, once the battery of any one of the IoT sensors has run out, the user should charge the IoT sensor or replace the battery of the IoT sensor, which would significantly increase the cost and is inefficient.

SUMMARY

An embodiment of the disclosure relates to an Internet-of-Things (IoT) power transfer sensor, which includes a sensor circuit, a group of retrodirective searching antennas and a group of energy harvesting antennas. The sensor circuit includes an energy converting and storage unit, a (RFID-like) control/modulation unit and a switching unit. The retrodirective searching antennas are connected to the switching unit. When the switching unit is in on-state, the retrodirective searching antennas detect the energy of the scanning signal of an external device having beamforming function and reflect the scanning signal back to the direction of the external device, such that the external device receives the reflected signal and can determine the direction of the position of the IoT wireless power sensor. The energy harvesting antennas are connected to the energy converting and storage unit and receive the incident energy in order to charge the energy converting and storage unit. When the power storage level of the energy converting and storage unit reaches a first threshold value, the (RFID-like) control/modulation unit controls the switching unit to be consecutively switched between on-state and off-state so as to transmit a device information in back-scattered way to the external device.

In one embodiment, the device information includes an identification code.

In one embodiment, when the device information is transmitted to the external device, the switching unit is switched to off-state, such that the retrodirective searching antennas receive the energy of the scanning signal in order to charge the energy converting and storage unit.

In one embodiment, the sensor circuit further includes a power conversion module and a voltage transformation module. The power conversion module converts the scanning signal into a power signal and the energy converting and storage unit is charged by the power signal via the voltage transformation module.

In one embodiment, the voltage transformation module includes a plurality of transformers having different transformation ratios, wherein when the energy converting and storage unit is out of power, the power conversion module automatically selects one of the transformers to convert an input voltage into a predetermined voltage corresponding to the transformer selected in order to charge the energy converting and storage unit.

In one embodiment, when the power storage level of the power storage unit reaches the first threshold value, the control/modulation unit detects a verification code transmitted from the external device and controls the switching unit to be consecutively switched between on-state and off-state so as to transmit the device information in the back-scattered way to the external device after the control/modulation unit confirms that the external device matches the IoT wireless power sensor.

In one embodiment, the sensor circuit further includes a power management module and a power storage module. When the power storage level of the energy converting and storage unit reaches a second threshold value, the power conversion module turns on the power management module, such that the power conversion module charges the power storage module via the power management module.

In one embodiment, the power storage module is a supercapacitor or a micro rechargeable battery.

In one embodiment, the device information further includes one or more of the power storage state of the power storage module, a security code and a sensor input/output state.

In one embodiment, the IoT wireless power transfer sensor includes a communication module and a communication antenna. When the power storage level of the power storage module reaches a target value, the power management module turns on the communication module and the communication module enters a communication mode in order to communicate with the other IoT power transfer sensors via the communication antenna. When the communication module is turned on, the switching unit is switched to off-state, such that the retrodirective searching antennas receives the energy of the scanning signal so as to charge the power storage module.

In one embodiment, when the communication module is turned on, the switching unit is switched to off-state.

The IoT wireless power transfer sensor according to the embodiments of the disclosure may have the following advantages:

(1) According to one embodiment of the disclosure, the retrodirective searching antennas of the IoT wireless power transfer sensor is connected to the switching unit thereof. Thus, when the IoT wireless power transfer sensor is out of power and the switching unit is in on-state, the retrodirective searching antennas can reflect the incident energy to the direction of the external device. Therefore, the external device can effectively detect the direction of position of the IoT wireless power transfer sensor and wirelessly transmit energy to the direction of the external device.

(2) According to one embodiment of the disclosure, the IoT wireless power transfer sensor can be charged by obtaining energy from the external device (or the surrounding thereof) via the energy harvesting antennas after the IoT wireless power transfer sensor is out of power. Then, the IoT wireless power transfer sensor can perform a special RFID-like communication mode via the retrodirective searching antennas, such that the external device can effectively recognize the IoT wireless power transfer sensor so as to continuously transmit energy to the IoT wireless power transfer sensor on a wireless basis. In this way, the IoT wireless power transfer sensor can obtain enough energy in a short time, so can normally communicate with other IoT devices. Thus, the IoT system can normally operate at all times.

(3) According to one embodiment of the disclosure, the IoT wireless power transfer sensor transmits the device information, including the identification code, the power storage state, the security code and the sensor I/O state, to the external device by the RFID-like communication mode via the retrodirective searching antennas after the IoT wireless power transfer sensor is out of power, so the external device can immediately obtain necessary information. Therefore, the IoT wireless power transfer sensor can achieve high practicality.

(4) According to one embodiment of the disclosure, the IoT wireless power transfer sensor can be charged by obtaining energy from the external device (or the surrounding thereof) via the energy harvesting antennas after the IoT wireless power transfer sensor is out of power. Accordingly, the user does not need to replace the battery of the IoT wireless power transfer sensor during the whole lifespan of the IoT wireless power transfer sensor. Therefore, the cost of the IoT system can be significantly reduced and the IoT system can be more conveniently in use.

(5) According to one embodiment of the disclosure, the IoT wireless power transfer sensor includes a voltage transformation module and the voltage transformation module includes a plurality of transformers having different transformation ratios. Thus, the voltage transformation module can transform the inputted voltage into a predetermined voltage so as to charge the energy converting and storage unit, which can achieve greater charging efficiency.

(6) According to one embodiment of the disclosure, the communication antenna, the retrodirective searching antennas and the energy harvesting antennas of the IoT wireless power transfer sensor are designed to be coexistent in one communication frequency band. Thus, these antennas would not interfere with each other, which can improve the charging efficiency and increase the communication distance.

(7) According to one embodiment of the disclosure, the IoT wireless power transfer sensor can achieve the desired technical effects without significantly increasing cost, so is of high commercial value.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The disclosure will become more fully understood from the detailed description given herein below and the accompanying drawings which are given by way of illustration only, and thus are not limitative of the disclosure and wherein.

DETAILED DESCRIPTION

Figure 1:
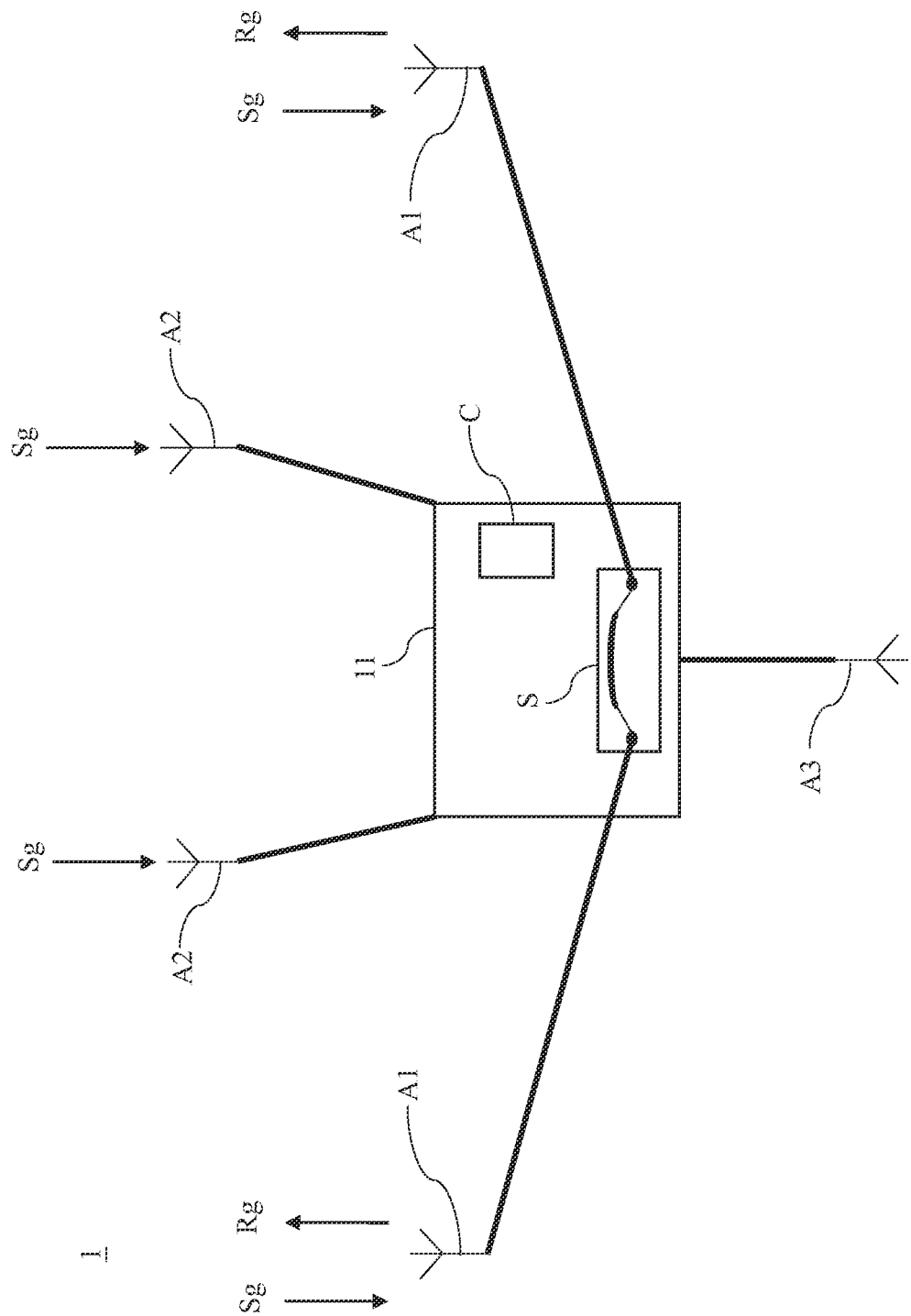
FIG. 1 is a first schematic view of an IoT wireless power transfer sensor in accordance with a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
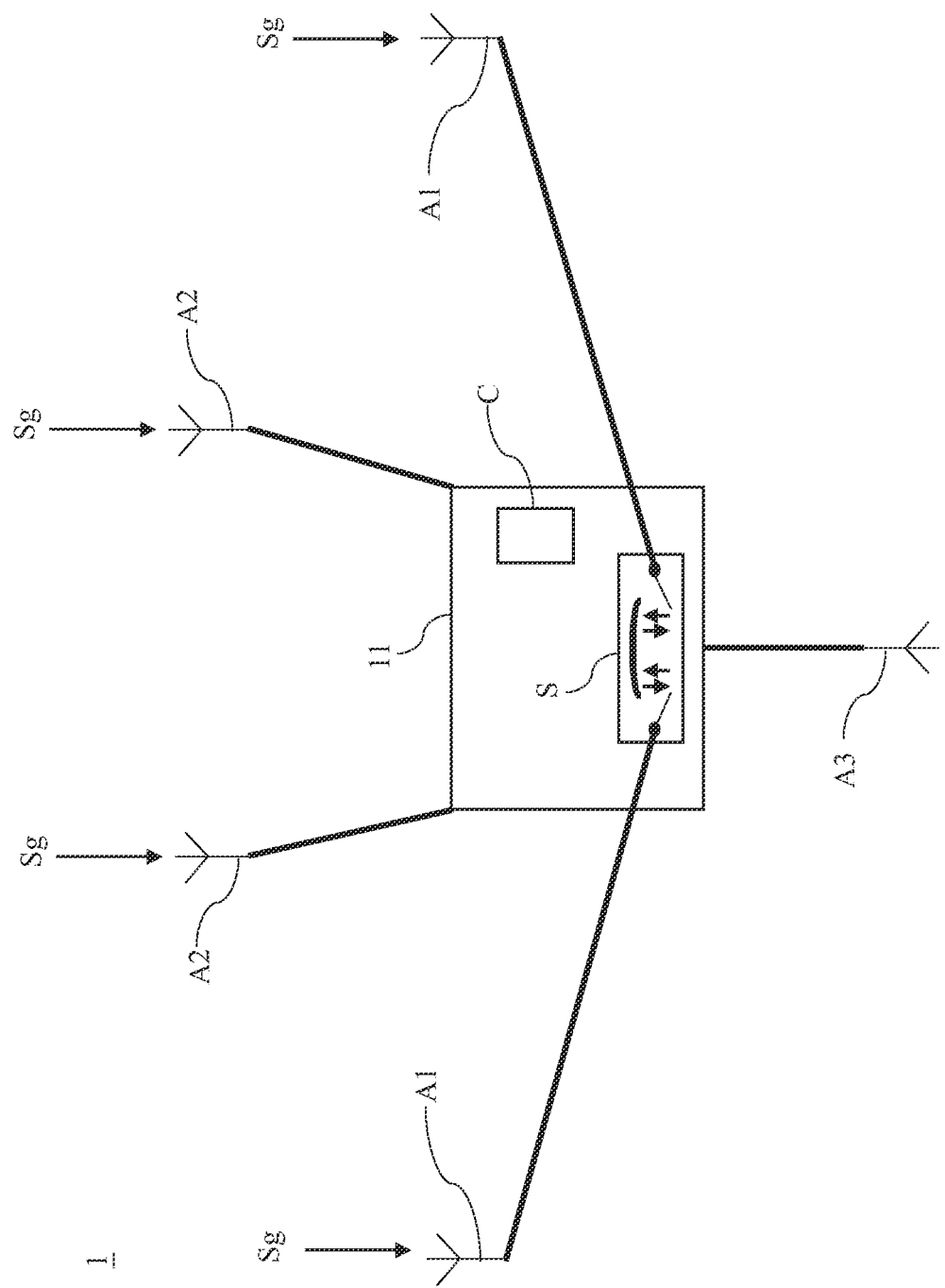
FIG. 2 is a second schematic view of the IoT wireless power transfer sensor in accordance with the first embodiment of the disclosure.
Figure 3:
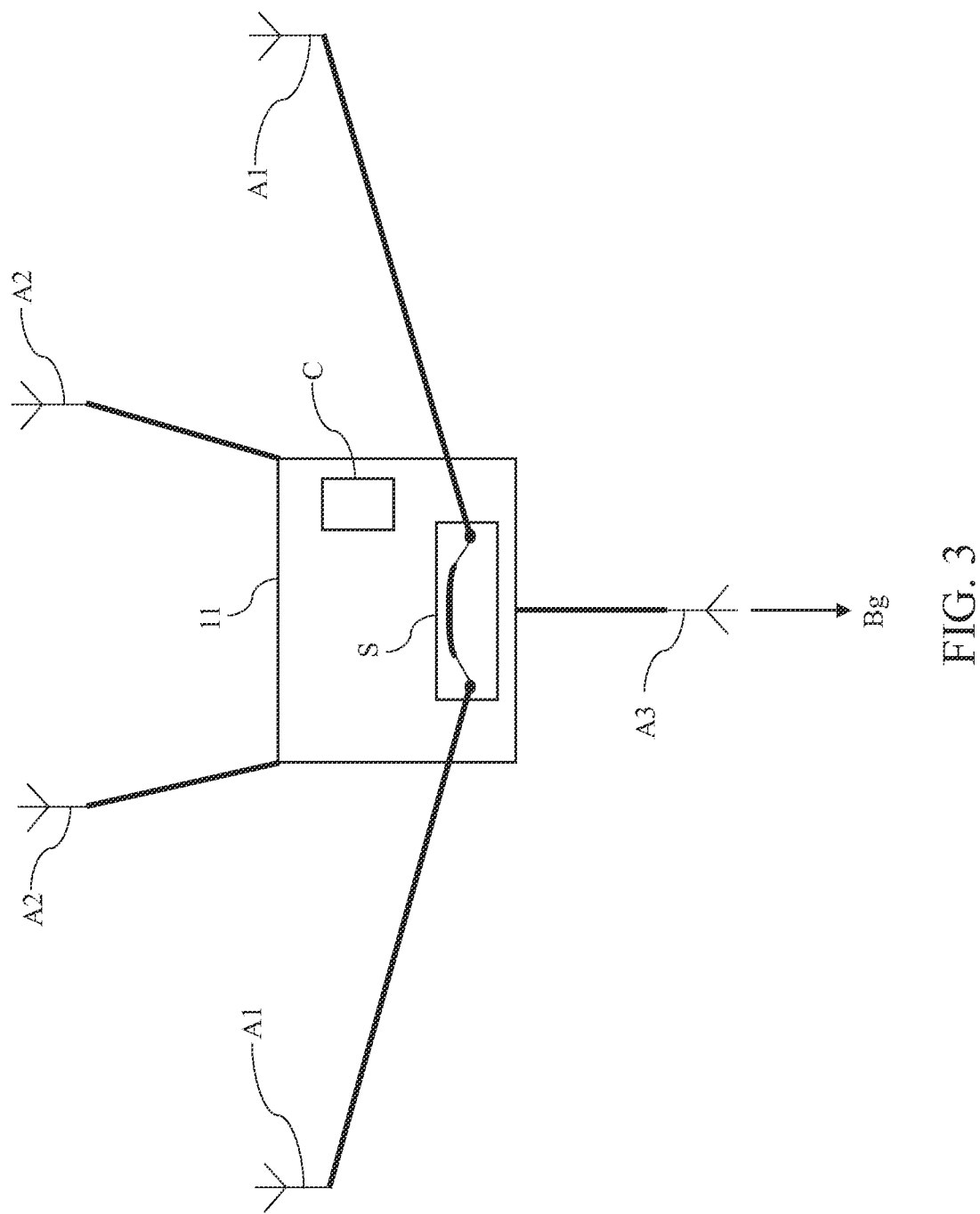
FIG. 3 is a third schematic view of the IoT wireless power transfer sensor in accordance with the first embodiment of the disclosure.

Please refer to FIG. 1, FIG. 2 and FIG. 3, which are a first schematic view, a second schematic view and a third schematic view of an IoT wireless power transfer sensor in accordance with a first embodiment of the disclosure. An Internet-of-Things (IoT) system includes a large number of IoT wireless power transfer sensors 1 and an external device can scan the surroundings thereof by transmitting a scanning signal Sg in order to search the IoT wireless power transfer sensors 1 around the external device. Then, the external device 1 can communicate with the IoT wireless power transfer sensors 1 in order to obtain necessary information. In this embodiment, the external device is a smart hub having beamforming function. In another embodiment, the external device may be a reader or other similar devices. When any one of the IoT wireless power transfer sensors 1 is out of power, the external device can effectively search out the IoT wireless power transfer sensor 1 via the retrodirective searching antennas thereof. In addition, the IoT wireless power transfer sensor 1 can be effectively recognized by the external device via a special RFID-like communication mode, such that the external device can charge the IoT wireless power transfer sensor 1 (via the energy harvesting antennas A2). In one embodiment, the IoT wireless power transfer sensors 1 may object recognition devices, door/window sensors, temperature sensors, moisture sensors, illuminance sensors or other IoT devices or sensors having different functions.

As shown in FIG. 1, the IoT wireless power transfer sensor 1 includes a sensor circuit 11, two retrodirective searching antennas A1, two energy harvesting antennas A2 and a communication antenna A3.

The sensor circuit 11 includes an energy converting and storage unit C and a switching unit S. In this embodiment, the energy converting and storage unit C is a capacitor; in another embodiment, the energy converting and storage unit C may be a battery or other elements capable of storing energy.

The retrodirective searching antennas A1 are connected to the switching unit S. The energy harvesting antennas A2 are connected to the energy converting and storage unit C.

When the IoT wireless power transfer sensor 1 is out of power, the switching unit S is in on-state. When the external device having beamforming function finds out the IoT wireless power transfer sensor 1 by scanning, the retrodirective searching antennas A1 detects the energy of the scanning signal Sg of the external device and reflects the scanning signal Sg back to the direction of the external device. When the external device receives the reflected signal R, the external device determines that the IoT wireless power transfer sensor 1 is one of the sensors of the IoT system (i.e. the external device matches the IoT wireless power transfer sensor 1). Afterward, the external device keeps trying to transmit the scanning signal Sg to the IoT wireless power transfer sensor 1 during a predetermined time period.

Meanwhile, the energy harvesting antennas A2 receive the scanning signal Sg (the incident signal) and the sensor circuit 11 converts the scanning signal Sg (the incident signal) into electric power so as to charge the energy converting and storage unit C.

As shown in FIG. 2, when the power storage level of the energy converting and storage unit C reaches a first threshold value, the sensor circuit 11 controls the switching unit S to be consecutively switched between on-state and off-state so as to transmit a device information to the external device in back-scattered way to the external device. When the external device confirms the identification (ID) code of the sensor 1, the external device can keep wirelessly transmitting energy to the sensor 1. In this embodiment, the device information includes the identification code of the IoT wireless power transfer sensor 1. In another embodiment, the device information may further include a power storage state, a security code and a sensor I/O (input/output) state.

As shown in FIG. 2, the switching unit S can remain off-state during the process of the external device wireless transmitting energy to the sensor 1.

Meanwhile, the retrodirective searching antennas A1 are also used to receive the energy of the scanning signal Sg (the incident signal). In this way, the energy converting and storage unit C can be charged via the retrodirective searching antennas A1 and the energy harvesting antennas A2 in order to increase the charging speed.

As shown in FIG. 3, when the sensor circuit 11 is fully charged, the IoT wireless power transfer sensor 1 can enter the operating status. At the moment, the IoT wireless power transfer sensor 1 can transmit the communication signal Bg to other IoT devices and receive the signals from other devices via the communication antenna A3 so as to communicate with other devices. When the IoT wireless power transfer sensor 1 has communicated with other devices or does not need to communicate with other devices, the IoT wireless power transfer sensor 1 returns to the sleep mode or the off mode. When the IoT wireless power transfer sensor 1 is out of power again, the IoT wireless power transfer sensor 1 can be charged again via the aforementioned mechanism, such that the IoT wireless power transfer sensor 1 can return to the operating status again.

As described above, when the power storage level of the energy converting and storage unit C reaches the first threshold value, the sensor circuit 11 is still in the sleep mode or the off mode; however, the power storage level of the energy converting and storage unit C is already enough to control the switching unit S to be consecutively switched between on-state and off-state. When the switching unit S is in on-state, the external device can receive the reflected signal Rg from the retrodirective searching antennas A1. On the contrary, when the switching unit S is in off-state, the external device cannot receive the reflected signal Rg. Accordingly, the IoT wireless power transfer sensor 1 can generate digital signals by switching the switching unit S (the switching unit S in on-state stands for 1 and the switching unit S in off-state stands for 0) and the external device can actively read the digital signals. That is to say, the IoT wireless power transfer sensor 1 does not actively transmit the digital signals to the external device, but shows the digital signals by switching the switching unit S. Accordingly, communication distance of the aforementioned RFID-like communication mode can be much greater than that of the conventional RFID communication mode.

The embodiment just exemplifies the disclosure and is not intended to limit the scope of the disclosure. Any equivalent modification and variation according to the spirit of the disclosure is to be also included within the scope of the following claims and their equivalents.

Figure 4:
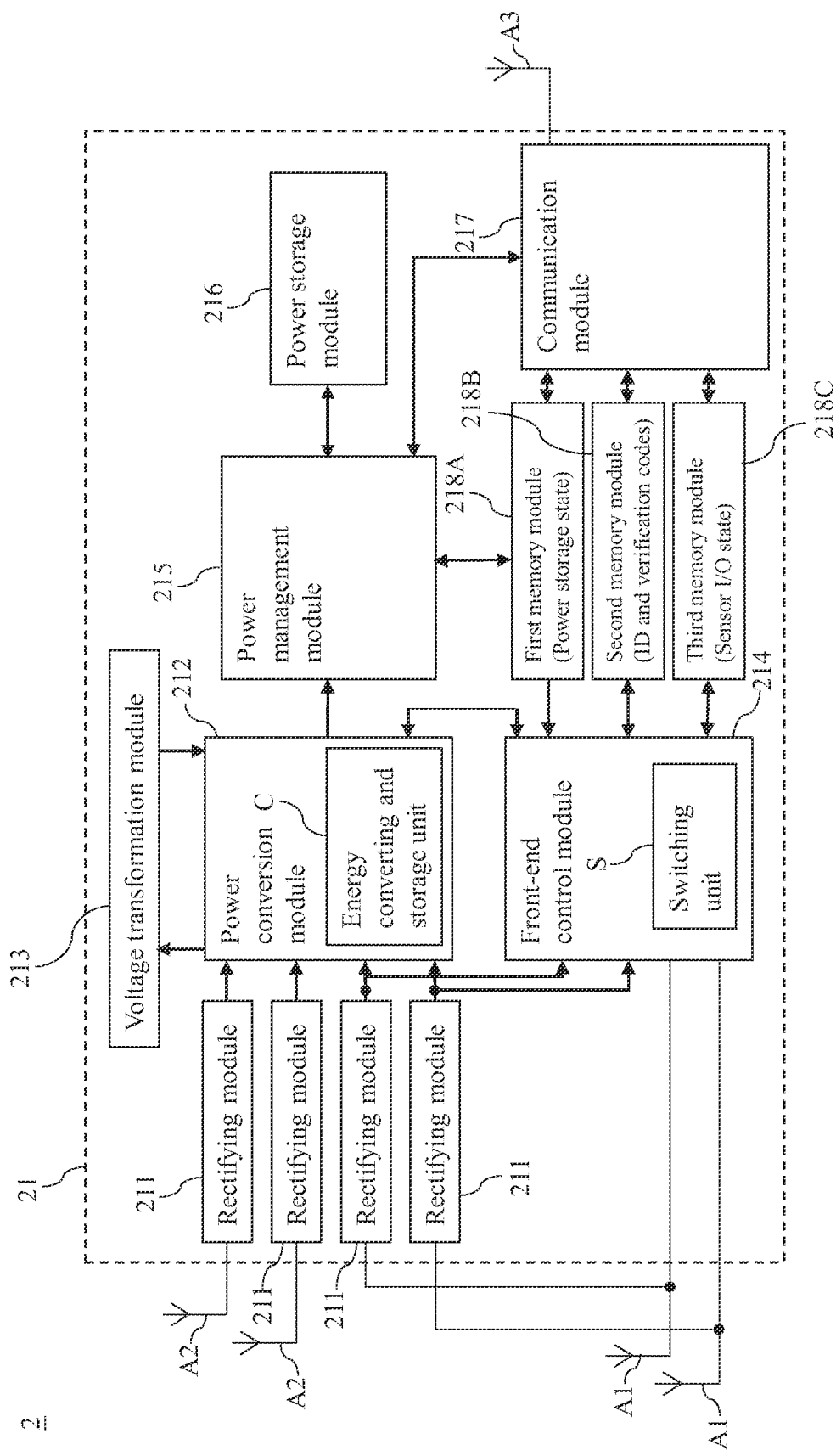
FIG. 4 is a circuit diagram of an IoT wireless power transfer sensor in accordance with a second embodiment of the disclosure.
Figure 5:
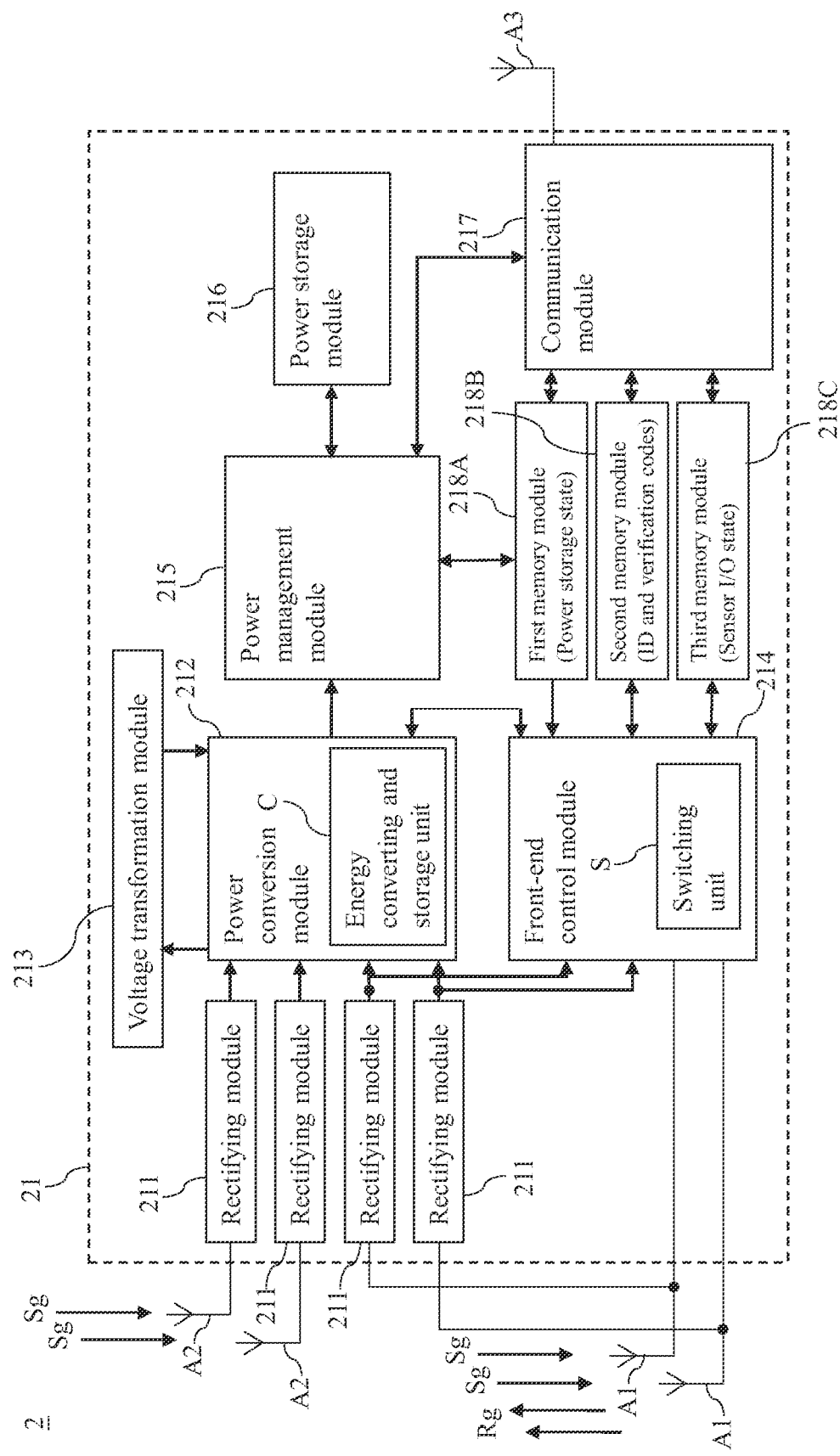
FIG. 5 is a view illustrating a first operational status of the IoT wireless power transfer sensor in accordance with the second embodiment of the disclosure.
Figure 6:
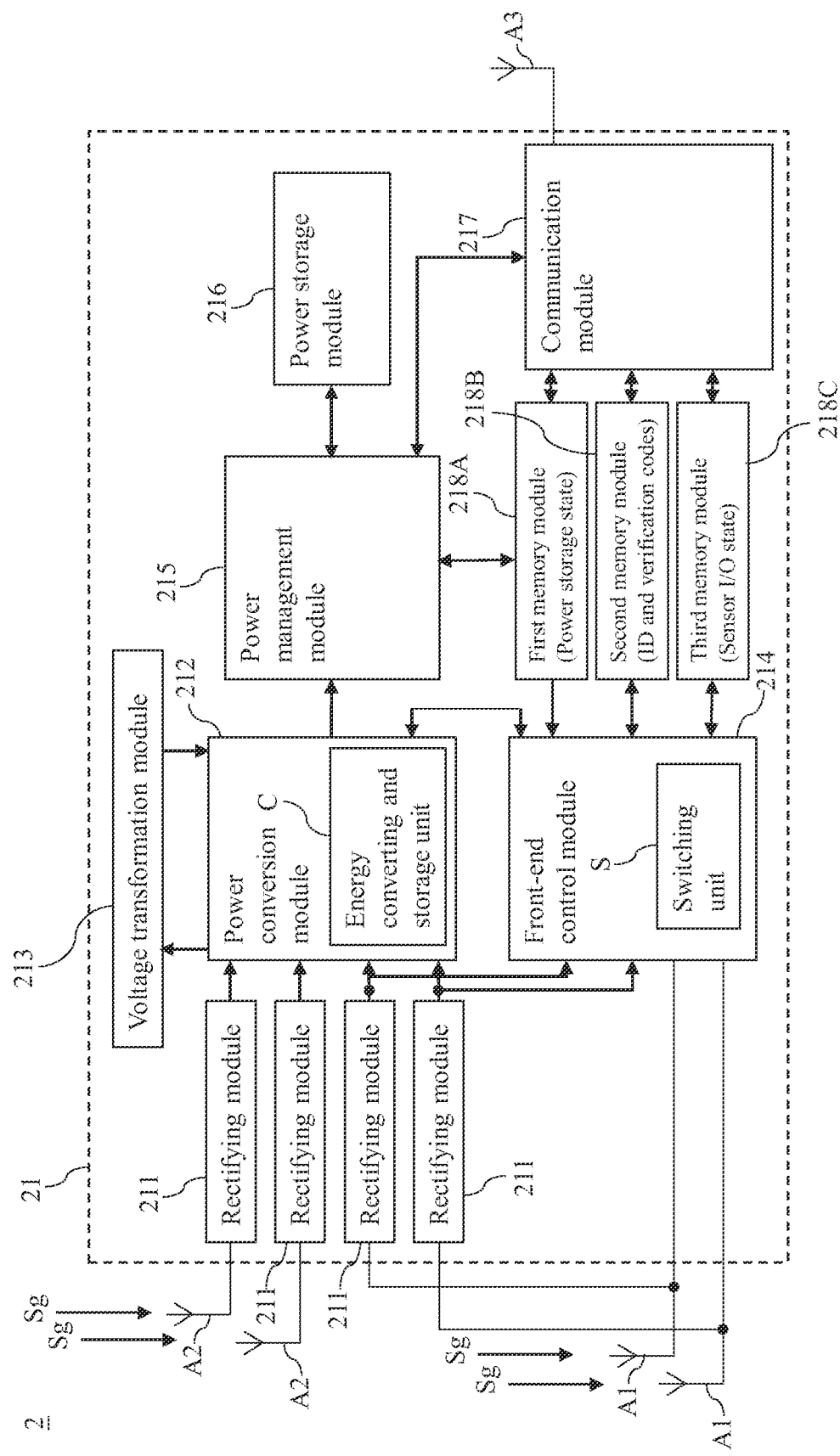
FIG. 6 is a view illustrating a second operational status of the IoT wireless power transfer sensor in accordance with the second embodiment of the disclosure.
Figure 7:
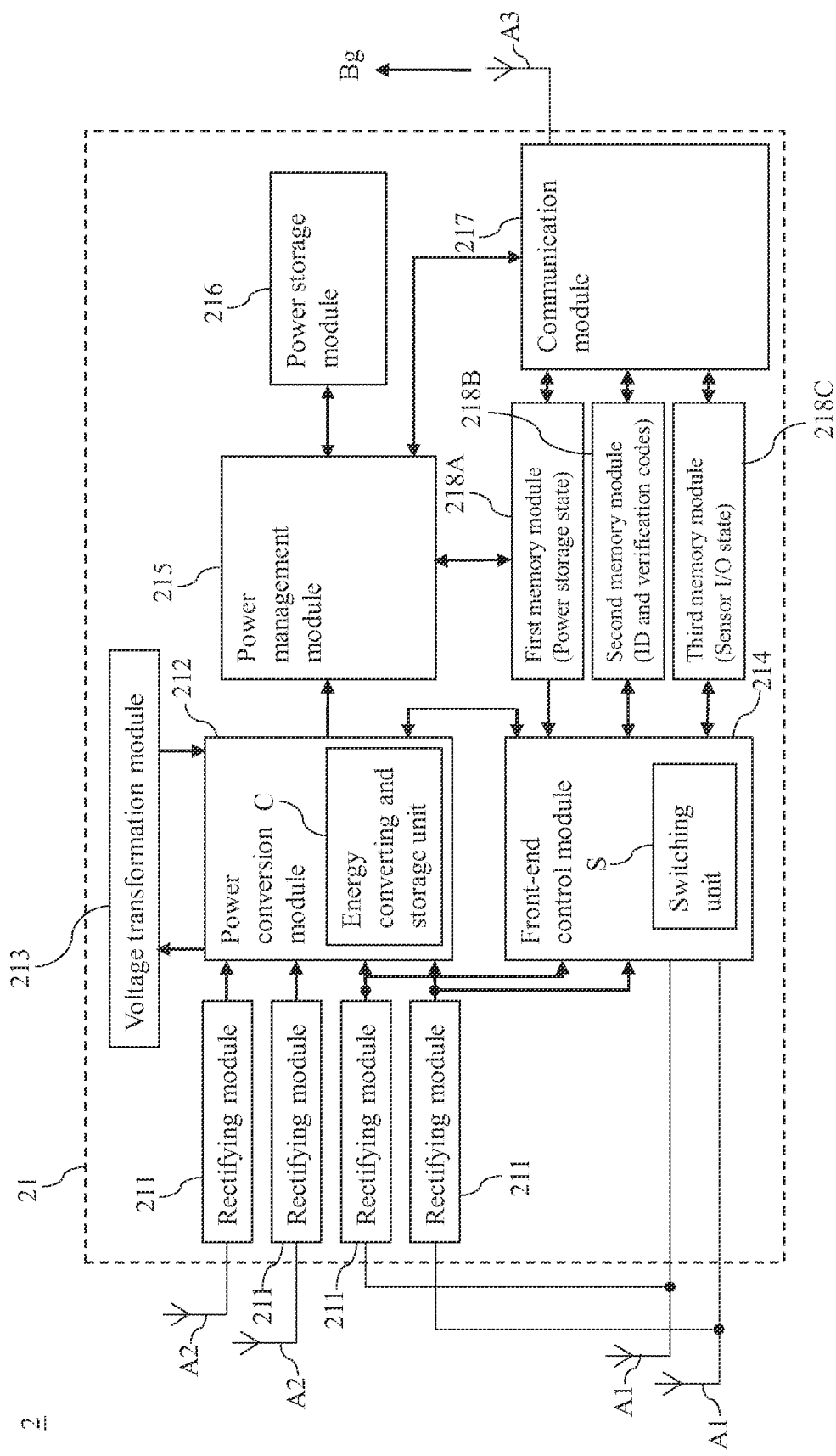
FIG. 7 is a view illustrating a third operational status of the IoT wireless power transfer sensor in accordance with the second embodiment of the disclosure.

Please refer to FIG. 4~FIG. 7. FIG. 4 is a circuit diagram of an IoT wireless power transfer sensor in accordance with a second embodiment of the disclosure. FIG. 5~FIG. 7 are views illustrating a first operational status, a second operational status and a third operational status of the IoT wireless power transfer sensor in accordance with the second embodiment of the disclosure. An IoT system includes a large number of IoT wireless power transfer sensors 2 and an external device can scan the surroundings thereof by transmitting a scanning signal Sg in order to search the IoT wireless power transfer sensors 2 around the external device. When any one of the IoT wireless power transfer sensors 2 is out of power, the external device can effectively search out the IoT wireless power transfer sensor 2 via the retrodirective searching antennas thereof and the IoT wireless power transfer sensor 2 can be effectively recognized by the external device via the special RFID-like communication mode, such that the external device can charge the IoT wireless power transfer sensor 2.

As shown in FIG. 4, the IoT wireless power transfer sensor 2 includes a sensor circuit 21, two retrodirective searching antennas A1, two energy harvesting antennas A2 and a communication antenna A3.

The sensor circuit 21 includes several rectifying modules 211, a power conversion module 212, a voltage transformation module 213, a front-end control module 214, a power management module 215, a power storage module 216, a communication module 217, a first memory module 218A, a second memory module 218B and a third memory module 218C.

The two rectifying modules 211 and are connected to the energy harvesting antennas A2 and the power conversion module 212. The other two rectifying modules 211 are connected to the retrodirective searching antennas A1 and the power conversion module 212, and are also connected to the front-end control module 214.

The power conversion module 212 has an energy converting and storage unit C. In addition, the power conversion module 212 is further connected to the voltage transformation module 213, the front-end control module 214 and the power management module 215. In another embodiment, the voltage transformation module 213 can be disposed in the power conversion module 212.

The front-end control module 212 has a switching unit S. Besides, the front-end control module 214 is further connected to the retrodirective searching antennas A1, a first memory module 218A, a second memory module 218B and a third memory module 218C.

The power management module 215 is further connected to the power storage module 216, the communication module 217 and the first memory module 218A. In this embodiment, the power storage module 216 may be a supercapacitor; in another embodiment, the power storage module 216 may be a micro rechargeable battery or other similar elements.

The communication module 217 is further connected to the communication antenna A3, the first memory module 218A, the second memory module 218B and the third memory module 218C.

As shown in FIG. 5, when the IoT wireless power transfer sensor 2 is out of power, the switching unit S is in on-state. When the external device having beamforming function finds out the IoT wireless power transfer sensor 2 by scanning, the retrodirective searching antennas A1 detects the energy of the scanning signal Sg of the external device and reflects the scanning signal Sg back to the direction of the external device. When the external device receives the reflected signal R, the external device determines that the IoT wireless power transfer sensor 2 may be one of the sensors of the IoT system (i.e. the external device matches the IoT wireless power transfer sensor 2). Afterward, the external device keeps trying to transmit the scanning signal Sg to the IoT wireless power transfer sensor 1 during a predetermined time period.

In the meanwhile, the energy harvesting antennas A2 receive the scanning signal Sg (the incident signal) and converts the scanning signal Sg (the incident signal) into a power signal. Then, the power signal is rectified by the rectifying modules 211 and then is transmitted to the power conversion module 212. The power conversion module 212 boosts the power signal by the voltage transformation module 213 to make the power signal reach a predetermined voltage (e.g. 0.5V, 1V, 1.5 C, etc.) or more than the predetermined voltage so as to charge the energy converting and storage unit C. The voltage transformation module 213 includes a plurality of transformers and the transformers have different transformation ratios in order to increase the power signals of different voltages to the predetermined voltage or more than the predetermined voltage. Therefore, the power conversion module 212 can make the most of the energy harvested by the energy harvesting antennas A2 with a view to achieve higher charging efficiency. The energy harvesting antennas A2 can receive the microwaves in a RF frequency band (the RF frequency band may be, but not limited to, 2.4 GHz; the RF frequency band may also be 900 MHz or other proper frequency bands), piezoelectric energy, thermoelectric energy or other energies, and convert the energy into a low voltage. Then, the voltage transformation module 21 can adjust the low voltage by a first boosting stage in order to charge the energy converting and storage unit C.

As shown in FIG. 6, when the power storage level of the energy converting and storage unit C reaches a first threshold value, the front-end control module 214 is activated. At the moment, the front-end control module 214 controls the switching unit S to be consecutively switched between on-state and off-state (please refer to FIG. 2 for more details) in order to transmit a device information to the external device in back-scattered way. When the external device confirms the identification code of the sensor 2, the external device can keep wirelessly transmitting energy to the sensor 2; the aforementioned device information includes the identification code, the power storage state, the security code and the sensor I/O state of the IoT wireless power transfer sensor 2. The first memory module 218A can save the power storage state of the IoT wireless power transfer sensor 2. The second memory module 218B can save the identification code and the security code of the IoT wireless power transfer sensor 2. The third memory module 218C can save the I/O state of the IoT wireless power transfer sensor 2. Therefore, the front-end control module 214 can obtain the aforementioned information via the first memory module 218A, the second memory module 218B and the third memory module 218C. As set forth above, the front-end control module 214 can generate the device information via controlling the switching unit S (the device information may be digital signals; the switching unit S in on-state stands for 1 and the switching unit S in off-state stands for 0) and the external device can actively read the digital signals. Accordingly, communication distance of the aforementioned RFID-like communication mode can be much greater than that of the conventional RFID communication mode.

As shown in FIG. 6, during the process of the external device confirming the device information and keeping wirelessly transmitting energy to the sensor 2, the front-end control module 214 switches the switching unit S to off-state. At the moment, the retrodirective searching antennas A1 are also sued to receive the energy of the scanning signal Sg (the incident signal). In this way, the retrodirective searching antennas A1 and the energy harvesting antennas A2 receive the scanning signal Sg (the incident signal) and convert the scanning signal Sg (the incident signal) into a power signal. The power signal is rectified by the rectifying modules 211 and transmitted to the power conversion module 212 so as to charge the energy converting and storage unit C. When the power storage level of the energy converting and storage unit C reaches a second threshold value, the power management module 215 is activated in order to adjust the power signal provided by the power conversion module 212 by a second boosting stage so as to charge the power storage module 216 and simultaneously update the information saved in the first memory module 218A. As described above, after the external device reads the device information, the front-end control module 214 switches the switching unit S to off-state, such that the retrodirective searching antennas A1 can also provide energy harvesting function so as to more quickly charge the power storage module 216.

As shown in FIG. 7, when the power storage level of the power storage module 216 reaches a target value, the power management module 215 turns on the communication module 217 and the communication module 217 enters a communication mode to transmit a communication signal Bg to other IoT devices and receive the signals from other devices so as to communicate with other devices. In this embodiment, the communication module 217 can communicate with the external device via Bluetooth communication protocol. In another embodiment, the communication module 217 can also communicate with the external device via Wi-Fi communication protocol, ZigBee protocol or other communication protocols. At the moment, the IoT wireless power transfer sensor 2 can normally communicate with other devices without using the aforementioned RFID-like communication mode. When the IoT wireless power transfer sensor 2 has communicated with other devices or does not need to communicate with other devices, the IoT wireless power transfer sensor 2 returns to the sleep mode or the off mode.

In addition, the communication antenna A3, the retrodirective searching antennas A1 and the energy harvesting antennas A2 may be designed to be coexistent in one communication frequency band. Thus, these antennas would not interfere with each other, which can improve the charging efficiency and increase the communication distance.

The embodiment just exemplifies the disclosure and is not intended to limit the scope of the disclosure. Any equivalent modification and variation according to the spirit of the disclosure is to be also included within the scope of the following claims and their equivalents.

As set forth above, when the IoT wireless power transfer sensor 2 is out of power, the external device can effectively search out the IoT wireless power transfer sensor 2 via the retrodirective searching antennas A1 thereof. In addition, the IoT wireless power transfer sensor 2 can be effectively recognized by the external device via the special RFID-like communication mode, such that the IoT wireless power transfer sensor 2 can normally communicate with the external device. Thus, the IoT system can normally operate at all times. Accordingly, the user does not need to replace the battery of the IoT wireless power transfer sensor 2 during the whole lifespan of the IoT wireless power transfer sensor 2. Therefore, the cost of the IoT system can be significantly reduced and the IoT system can be more conveniently in use.

It is worthy to point out that although the currently available IoT sensors are of low power consumption, these sensors still need to be powered by batteries, or these sensors cannot normally operate. Therefore, once the battery of any one of the IoT sensors has run out, the IoT system cannot normally work. On the contrary, according to one embodiment of the disclosure, the IoT wireless power transfer sensor can be charged by obtaining energy from the external device (or the surrounding thereof) via the energy harvesting antennas after the IoT wireless power transfer sensor is out of power. Then, the IoT wireless power transfer sensor can perform a special RFID-like communication mode via the retrodirective searching antennas, such that the external device can effectively recognize the IoT wireless power transfer sensor so as to continuously transmit energy to the IoT wireless power transfer sensor on a wireless basis. In this way, the IoT wireless power transfer sensor can obtain enough energy in a short time, so can normally communicate with other IoT devices. Thus, the IoT system can normally operate at all times.

The currently available IoT sensors have no effective charging mechanism Thus, once the battery of any one of the IoT sensors has run out, the user should charge the IoT sensor or replace the battery of the IoT sensor, which would significantly increase the cost and is inefficient. On the contrary, according to one embodiment of the disclosure, the IoT wireless power transfer sensor can be charged by obtaining energy from the external device (or the surrounding thereof) via the energy harvesting antennas after the IoT wireless power transfer sensor is out of power. Accordingly, the user does not need to replace the battery of the IoT wireless power transfer sensor during the whole lifespan of the IoT wireless power transfer sensor. Therefore, the cost of the IoT system can be significantly reduced and the IoT system can be more conveniently in use.

Also, according to one embodiment of the disclosure, the IoT wireless power transfer sensor transmits the device information, including the identification code, the power storage state, the security code and the sensor I/O state, to the external device by the RFID-like communication mode via the retrodirective searching antennas after the IoT wireless power transfer sensor is out of power, so the external device can immediately obtain necessary information. Therefore, the IoT wireless power transfer sensor can achieve high practicality.

Besides, according to one embodiment of the disclosure, the IoT wireless power transfer sensor includes a voltage transformation module and the voltage transformation module includes a plurality of transformers having different transformation ratios. Thus, the voltage transformation module can transform the inputted voltage into a predetermined voltage so as to charge the energy converting and storage unit, which can achieve greater charging efficiency.

Moreover, according to one embodiment of the disclosure, the communication antenna, the retrodirective searching antennas and the energy harvesting antennas of the IoT wireless power transfer sensor are designed to be coexistent in one communication frequency band. Thus, these antennas would not interfere with each other, which can improve the charging efficiency and increase the communication distance.

Furthermore, according to one embodiment of the disclosure, the IoT wireless power transfer sensor can achieve the desired technical effects without significantly increasing cost, so is of high commercial value. As described above, the IoT wireless power transfer sensor according to the embodiments of the disclosure can definitely achieve great technical effects.

Figure 8:
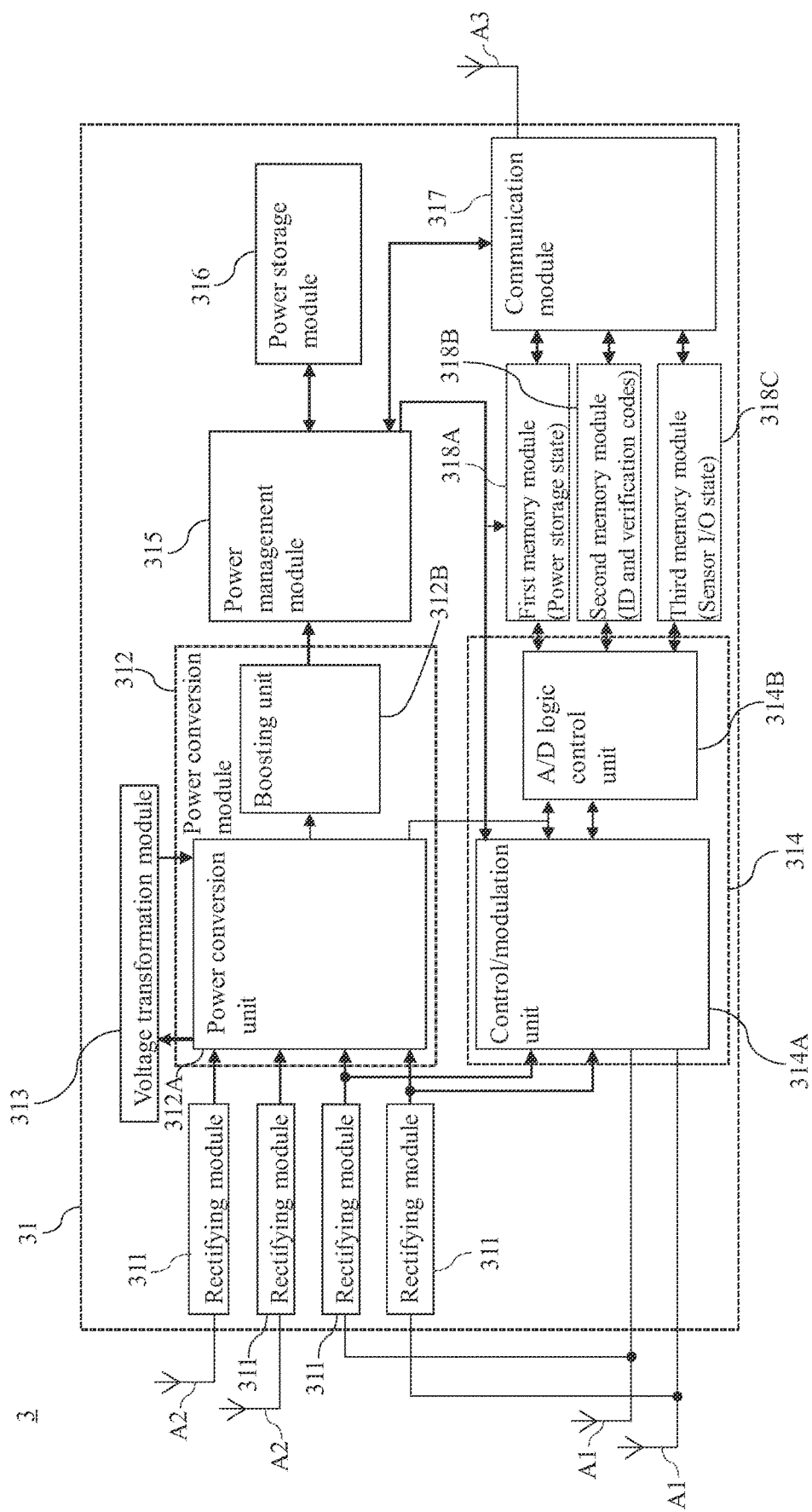
FIG. 8 is a circuit diagram of an IoT wireless power transfer sensor in accordance with a third embodiment of the disclosure.

Please refer to FIG. 8, which is a circuit diagram of an IoT wireless power transfer sensor in accordance with a third embodiment of the disclosure. As shown in FIG. 8, the IoT wireless power transfer sensor 3 includes a sensor circuit 31, two retrodirective searching antennas A1, two energy harvesting antennas A2 and a communication antenna A3.

The sensor circuit 31 includes several rectifying modules 311, a power conversion module 312, a voltage transformation module 313, a front-end control module 314, a power management module 315, a power storage module 316, a communication module 317, a first memory module 318A, a second memory module 318B and a third memory module 318C.

The above elements are similar to the corresponding elements of the previous embodiment, so will not be described herein again. The different between this embodiment and the previous embodiment is that the power conversion module 312 includes a power conversion unit 312A and a boosting unit 312B. The power conversion unit 312A includes an energy converting and storage unit. Moreover, the front-end control module 314 includes a (RFID-like) control/modulation unit 314A and an A/D (analog/digital) logic control unit 314B. Besides, the control/modulation unit 314A includes a switching unit.

When the external device determines that the IoT wireless power transfer sensor 3 is one of the sensors of the IoT system, the external device keeps transmitting the scanning signal to the IoT wireless power transfer sensor 3. The control/modulation unit 314A demodulates the scanning signal to generate a demodulated signal and transmits the demodulated signal to the A/D logic control unit 314B. The A/D logic control unit 314B compares the demodulated signal with the stored information in order to determine whether the external deice is one of the devices of the IoT system (i.e. whether the external device matches the IoT wireless power transfer sensor 3 or not). If the A/D logic control unit 314B determines that the external deice is one of the devices of the IoT system, the A/D logic control unit 314B can modulate the device information via the control/modulation unit 314A to generate a modulated signal and transmit the modulated signal to the external device via the aforementioned RFID-like communication mode.

Meanwhile, the energy harvesting antennas A2 receive the scanning signal Sg (incident signal) and convert the scanning signal Sg into a power signal. Then, the power signal is rectified by the rectifying modules 311 and then transmitted to the power conversion module 312A. Afterward, the power conversion module 312A boosts the power signal via the voltage transformation module 313 and the boosting unit 312B performs some switching operations.

The operations of the other elements are similar to the operations of the corresponding elements of the previous embodiment, so will not be described herein again.

The embodiment just exemplifies the disclosure and is not intended to limit the scope of the disclosure. Any equivalent modification and variation according to the spirit of the disclosure is to be also included within the scope of the following claims and their equivalents.

To sum up, according to one embodiment of the disclosure, the retrodirective searching antennas of the IoT wireless power transfer sensor is connected to the switching unit thereof. Thus, when the IoT wireless power transfer sensor is out of power and the switching unit is in on-state, the retrodirective searching antennas can reflect the incident energy to the direction of the external device. Therefore, the external device can effectively detect the direction of position of the IoT wireless power transfer sensor and wirelessly transmit energy to the direction of the external device.

According to one embodiment of the disclosure, the IoT wireless power transfer sensor can be charged by obtaining energy from the external device (or the surrounding thereof) via the energy harvesting antennas after the IoT wireless power transfer sensor is out of power. Then, the IoT wireless power transfer sensor can perform a special RFID-like communication mode via the retrodirective searching antennas, such that the external device can effectively recognize the IoT wireless power transfer sensor so as to continuously transmit energy to the IoT wireless power transfer sensor on a wireless basis. In this way, the IoT wireless power transfer sensor can obtain enough energy in a short time, so can normally communicate with other IoT devices. Thus, the IoT system can normally operate at all times.

According to one embodiment of the disclosure, the IoT wireless power transfer sensor transmits the device information, including the identification code, the power storage state, the security code and the sensor I/O state, to the external device by the RFID-like communication mode via the retrodirective searching antennas after the IoT wireless power transfer sensor is out of power, so the external device can immediately obtain necessary information. Therefore, the IoT wireless power transfer sensor can achieve high practicality.

Also, according to one embodiment of the disclosure, the IoT wireless power transfer sensor can be charged by obtaining energy from the external device (or the surrounding thereof) via the energy harvesting antennas after the IoT wireless power transfer sensor is out of power. Accordingly, the user does not need to replace the battery of the IoT wireless power transfer sensor during the whole lifespan of the IoT wireless power transfer sensor. Therefore, the cost of the IoT system can be significantly reduced and the IoT system can be more conveniently in use.

Besides, according to one embodiment of the disclosure, the IoT wireless power transfer sensor includes a voltage transformation module and the voltage transformation module includes a plurality of transformers having different transformation ratios. Thus, the voltage transformation module can transform the inputted voltage into a predetermined voltage so as to charge the energy converting and storage unit, which can achieve greater charging efficiency.

Moreover, according to one embodiment of the disclosure, the communication antenna, the retrodirective searching antennas and the energy harvesting antennas of the IoT wireless power transfer sensor are designed to be coexistent in one communication frequency band. Thus, these antennas would not interfere with each other, which can improve the charging efficiency and increase the communication distance.

Furthermore, according to one embodiment of the disclosure, the IoT wireless power transfer sensor can achieve the desired technical effects without significantly increasing cost, so is of high commercial value.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An internet of things (IoT) wireless power transfer sensor, comprising:
a sensor circuit, comprising an energy converting and storage unit, a control/modulation unit, a switching unit, a power conversion module, a voltage transformation module, a power management module and a power storage module;
a group of retrodirective searching antennas, connected to the switching unit, wherein when the switching unit is in an on-state, the retrodirective searching antennas detect an energy of a scanning signal, for searching the IoT wireless power transfer sensor, of an external device having a beamforming function and reflect the scanning signal to a direction of the external device, whereby the external device receives a reflected signal in order to obtain a direction of location of the IoT wireless power sensor;
a group of energy harvesting antennas, connected to the energy converting and storage unit, wherein when a power storage level of the energy converting and storage unit is less than a first threshold value, the energy harvesting antennas receive the scanning signal in order to charge the energy converting and storage unit via the scanning signal, wherein when the power storage level of the energy converting and storage unit is less than the first threshold value, the sensor circuit is out of power, wherein the energy harvesting antennas convert the scanning signal into a power signal, and the power conversion module performs a first boosting stage via the voltage transformation module to boost the power signal so as to charge the energy converting and storage unit by the power signal; and wherein when the power storage level of the energy converting and storage unit reaches the first threshold value, the control/modulation unit controls the switching unit to be consecutively switched between on-state and off-state so as to transmit a device information in a back-scattered way to the external device, wherein after the device information is transmitted to the external device, the control/modulation unit controls the switching unit to enter an off state, and both of the energy harvesting antennas and the retrodirective searching antennas receive the scanning signal to charge the energy converting and storage unit via the scanning signal so as to make the power storage level of the energy converting and storage unit more efficiently reach a second threshold value, wherein when the power storage level of the energy converting and storage unit reaches the second threshold value, the power conversion module turns on the power management module in order to adjust the power signal provided by the power conversion module by a second boosting stage so as to charge the power storage module.

2. The IoT wireless power transfer sensor of claim 1, wherein the device information comprises an identification code.

3. The IoT wireless power transfer sensor of claim 1, wherein the voltage transformation module comprises a plurality of transformers having different transformation ratios, wherein when the energy converting and storage unit is out of power, the power conversion module automatically selects one of the transformers to convert an input voltage into a predetermined voltage corresponding to the transformer selected in order to charge the energy converting and storage unit.

4. The IoT wireless power transfer sensor of claim 1, wherein when the power storage level of the power storage unit reaches the first threshold value, the control/modulation unit detects a verification code transmitted from the external device and controls the switching unit to be consecutively switched between on-state and off-state so as to transmit the device information in the back-scattered way to the external device after the control/modulation unit confirms that the external device matches the IoT wireless power sensor.

5. The IoT wireless power transfer sensor of claim 1, wherein the power storage module is a supercapacitor or a micro rechargeable battery.

6. The IoT wireless power transfer sensor of claim 1, wherein the device information further comprises one or more of a power storage state of the power storage module, a security code and a sensor input/output state.

7. The IoT wireless power transfer sensor of claim 1, further comprises a communication module and a communication antenna, wherein when a power storage level of the power storage module reaches a target value, the power management module turns on the communication module and the communication module enters a communication mode in order to communicate with other IoT power transfer sensors via the communication antenna, wherein when the communication module is turned on, the switching unit is switched to off-state, whereby the retrodirective searching antennas receives the energy of the scanning signal so as to charge the power storage module.

* * * * *